(12) United States Patent
Robson et al.

(10) Patent No.: US 11,353,145 B2
(45) Date of Patent: Jun. 7, 2022

(54) SEAL MEMBER FOR A HYDRAULIC FLUID ACTUATOR

(71) Applicant: Nissan North America, Inc., Franklin, TN (US)

(72) Inventors: Paul Robson, Milford, MI (US); Scott Warnecke, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 1207 days.

(21) Appl. No.: 15/212,631

(22) Filed: Jul. 18, 2016

(65) Prior Publication Data

US 2018/0017193 A1 Jan. 18, 2018

(51) Int. Cl.
*F16L 15/00* (2006.01)
*F16L 15/08* (2006.01)

(52) U.S. Cl.
CPC .............. *F16L 15/008* (2013.01); *F16L 15/08* (2013.01)

(58) Field of Classification Search
CPC ...... F16L 15/008; F16L 15/08; F16L 19/0212
USPC ...................... 285/332, 332.1, 355, 3–4, 353; 220/359.1–359.4; 215/232
See application file for complete search history.

(56) References Cited

U.S. PATENT DOCUMENTS

| | | | | |
|---|---|---|---|---|
| 1,933,117 A * | 10/1933 | Markle | ................... | F16L 55/10 285/3 |
| 3,202,442 A * | 8/1965 | Johnc | ................... | F16L 29/005 285/3 |
| 3,900,223 A * | 8/1975 | Schafer | ................... | F16L 29/005 285/4 |
| 4,089,101 A * | 5/1978 | Balon | ..................... | F16L 39/00 285/382.5 |
| 4,902,043 A * | 2/1990 | Zillig | ................... | F16L 37/0987 138/89 |
| 5,078,429 A * | 1/1992 | Braut | ...................... | F16L 37/38 285/4 |
| 5,106,127 A * | 4/1992 | Briet | ....................... | F16L 37/38 285/110 |
| 5,269,723 A * | 12/1993 | Bender | ................ | B60H 3/0028 239/57 |
| 5,492,147 A * | 2/1996 | Challender | ........... | F16L 29/005 137/614.05 |
| 6,382,678 B1 * | 5/2002 | Field | ........................ | F16L 39/00 116/200 |
| 6,481,756 B1 * | 11/2002 | Field | ..................... | F16L 29/005 285/124.1 |
| 6,892,537 B1 | 5/2005 | Hurwic | | |
| 7,981,090 B2 * | 7/2011 | Plishka | ............... | A61M 39/045 604/246 |
| 8,245,732 B2 * | 8/2012 | Coscarella | .............. | F16L 55/11 138/89 |
| 8,645,039 B2 | 2/2014 | Schneider et al. | | |
| 9,010,500 B2 | 4/2015 | Uchida et al. | | |

(Continued)

*Primary Examiner* — Matthew Troutman
*Assistant Examiner* — Fannie C Kee
(74) *Attorney, Agent, or Firm* — Global IP Counselors, LLP (57) ABSTRACT

A hydraulic fluid actuator has a housing and a seal member. The housing has a hydraulic hose port that is configured to receive a hydraulic hose. The seal member seals the hydraulic hose port. The seal member includes a frangible section configured to rupture upon attachment of the hydraulic hose into the hydraulic hose port with the seal member remaining between the hydraulic hose and the hydraulic hose port after attachment.

12 Claims, 8 Drawing Sheets

(56) References Cited

U.S. PATENT DOCUMENTS

2009/0179388 A1* 7/2009 Uhlenkamp ............ F16L 17/06
             277/608
2013/0291970 A1* 11/2013 Schnell ............... A61M 1/3639
             137/565.01
2014/0038757 A1 2/2014 Kariyama et al.

* cited by examiner

SEAL MEMBER FOR A HYDRAULIC FLUID ACTUATOR

BACKGROUND

Field of the Invention

The present invention generally relates to a seal member for a hydraulic fluid actuator of a vehicle. More specifically, the present invention relates to a seal member configured to seal at least one hydraulic port of a hydraulic fluid actuator.

Background Information

Typically, during assembly of a vehicle, the hydraulic fluid actuator is delivered to the vehicle manufacturing facility to be assembled to a hydraulic hose assembly. At this stage, each hydraulic hose of the hydraulic hose assembly is inserted into a corresponding hydraulic hose port of the hydraulic fluid actuator. Prior to delivery of the hydraulic fluid actuator to the manufacturing facility, the hydraulic hose ports are covered with a seal member in order to prevent dirt, water, grease or other contaminants from entering the hydraulic hose ports. Conventionally, the seal member is removed from the hydraulic fluid actuator immediately prior to the installation of the hydraulic hose assembly to the hydraulic fluid actuator. In some instances, a separate seal member is disposed over each hydraulic hose port which has to be individually removed during assembly of the hydraulic fluid actuator to the hydraulic hose assembly.

SUMMARY

In view of the state of the known technology, one aspect of the present disclosure is to provide a hydraulic fluid actuator comprising a housing and a seal member. The housing has at least one hydraulic hose port that is configured to receive a hydraulic hose. The seal member is disposed in front of and sealing the hydraulic hose port. The seal member includes a frangible section configured to rupture upon attachment of the hydraulic hose into the hydraulic hose port with the seal member remaining between the hydraulic hose and the hydraulic hose port after attachment.

In view of the state of the known technology, a second aspect of the present invention is to provide a method of attaching a hydraulic hose to a hydraulic hose port of a hydraulic fluid actuator housing having. The method comprises applying a seal member over the hydraulic hose port. The seal member has a frangible section configured to rupture upon attachment of the hydraulic hose to the hydraulic hose port. The method further comprises rupturing the seal member at the frangible section by inserting the hydraulic hose into the hydraulic hose port with the seal member remaining between the hydraulic hose and the hydraulic hose port after attachment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
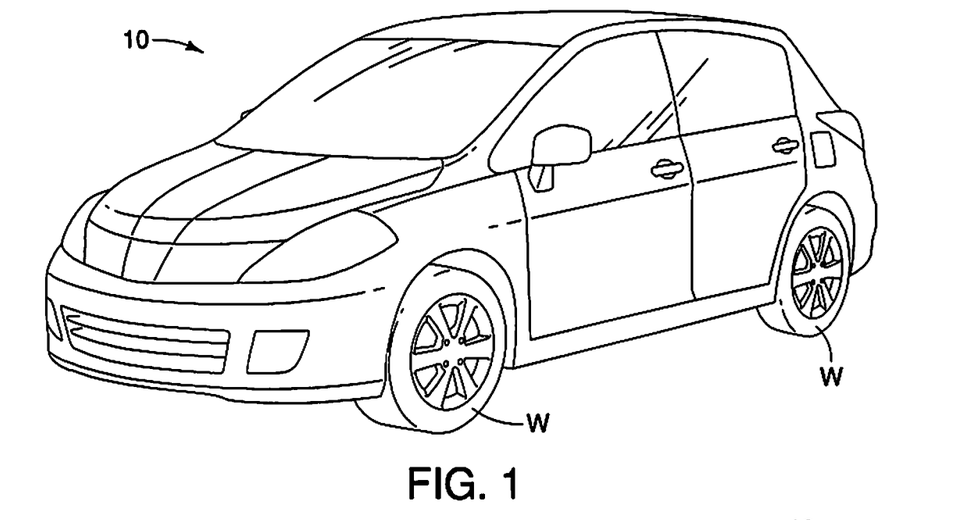
FIG. 1 is a front perspective view of a vehicle equipped with an anti-lock braking system.
Figure 2:
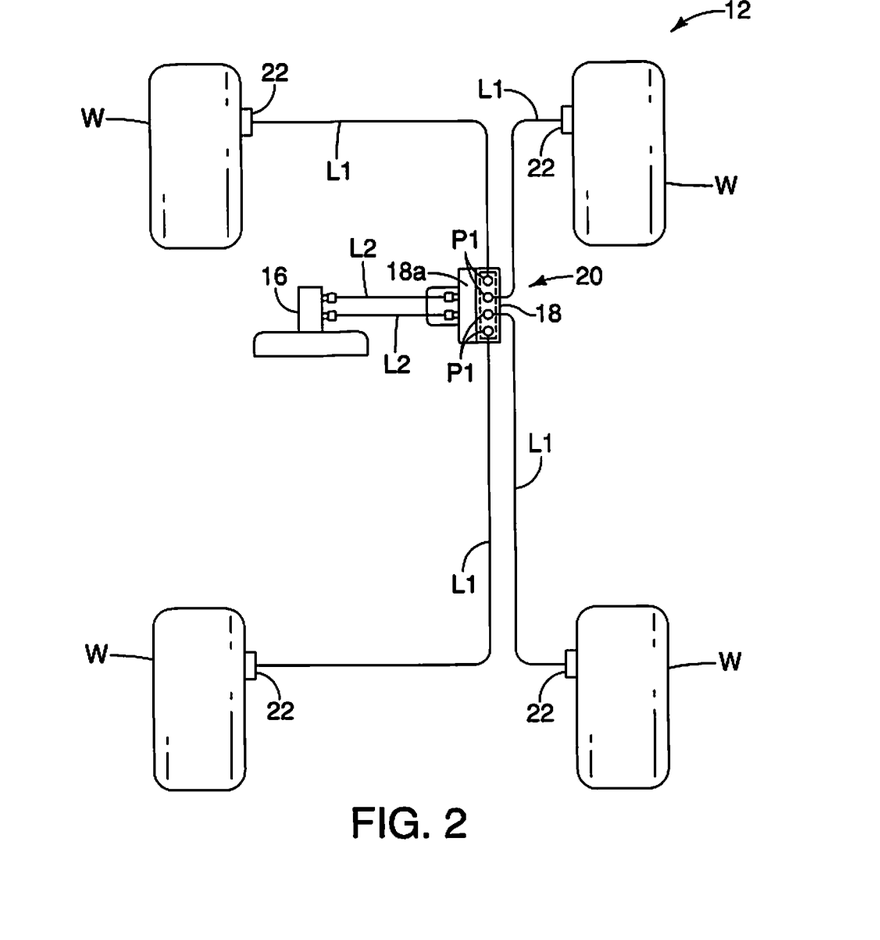
FIG. 2 is a schematic view of the anti-lock braking system of the vehicle of FIG. 1 having a hydraulic fluid actuator with a pair of seal members.
Figure 3:
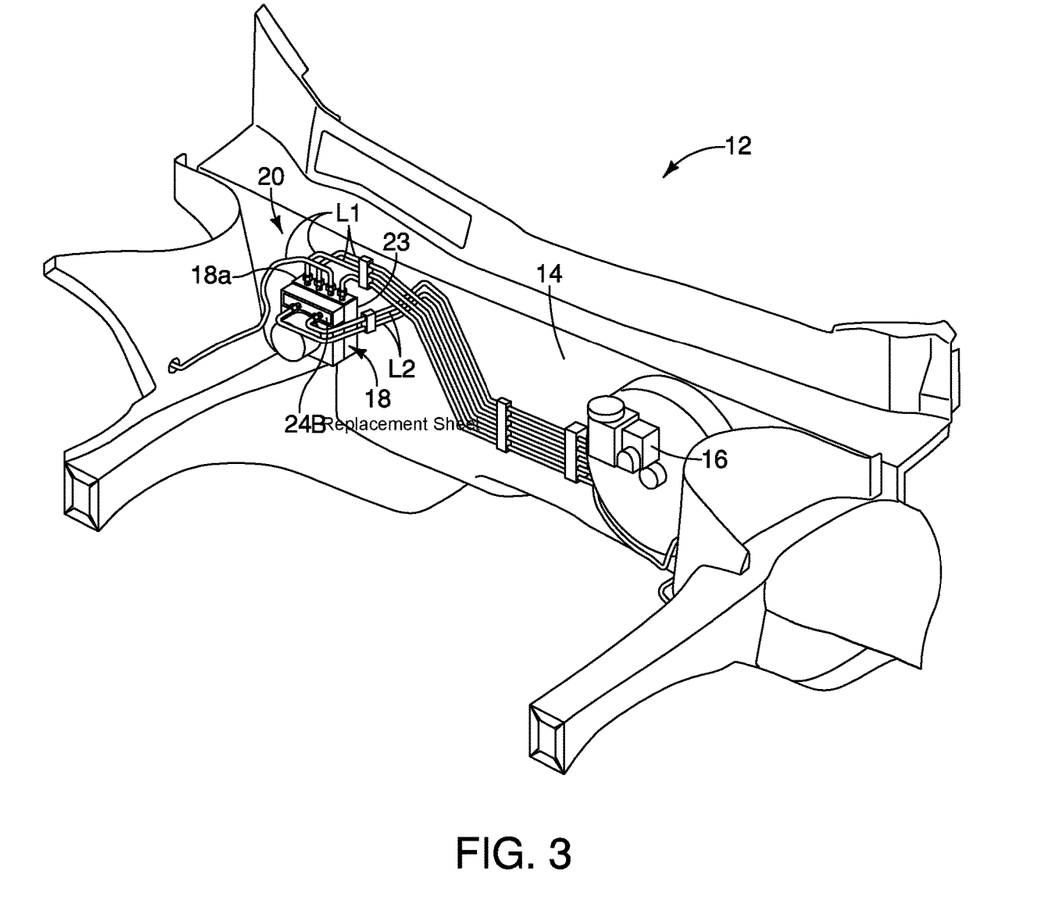
FIG. 3 is a perspective view of a portion of an engine compartment of the vehicle of FIG. 1, showing selected parts of the anti-lock braking system including the master cylinder, the hydraulic hose assembly and the hydraulic fluid actuator.

Referring now initially to FIGS. 1 to 3, a vehicle 10 is illustrated equipped with an anti-lock braking system 12 (ABS 12). Portions of the ABS 12 are fixed to a dash wall 14 within an engine compartment of the vehicle 10, as shown in FIG. 3. The ABS 12 basically includes a master cylinder 16, a hydraulic fluid actuator 18 (hereinafter "actuator 18"), a hydraulic hose assembly 20 and four calipers 22 for wheels W of the vehicle 10. The hydraulic hose assembly 20 includes a plurality of first hydraulic hoses L1 having collars 46 that fluidly connect the hydraulic fluid actuator 18 to the calipers 22. The hydraulic hose assembly 20 further includes a plurality of second hydraulic hoses L2 that fluidly connect the master cylinder 16 to the hydraulic fluid actuator 18. The master cylinder 16, the hydraulic fluid actuator 18, the hydraulic hose assembly 20 and the calipers 22 are conventional components that are well known in the automotive field. Since these parts of the ABS 12 are well known, the structures and the operations of the master cylinder 16, the hydraulic fluid actuator 18, the hydraulic hose assembly 20 and the calipers 22 will not be discussed in detail herein except to the extent that they have been modified to carry out the present invention.

Figure 4:
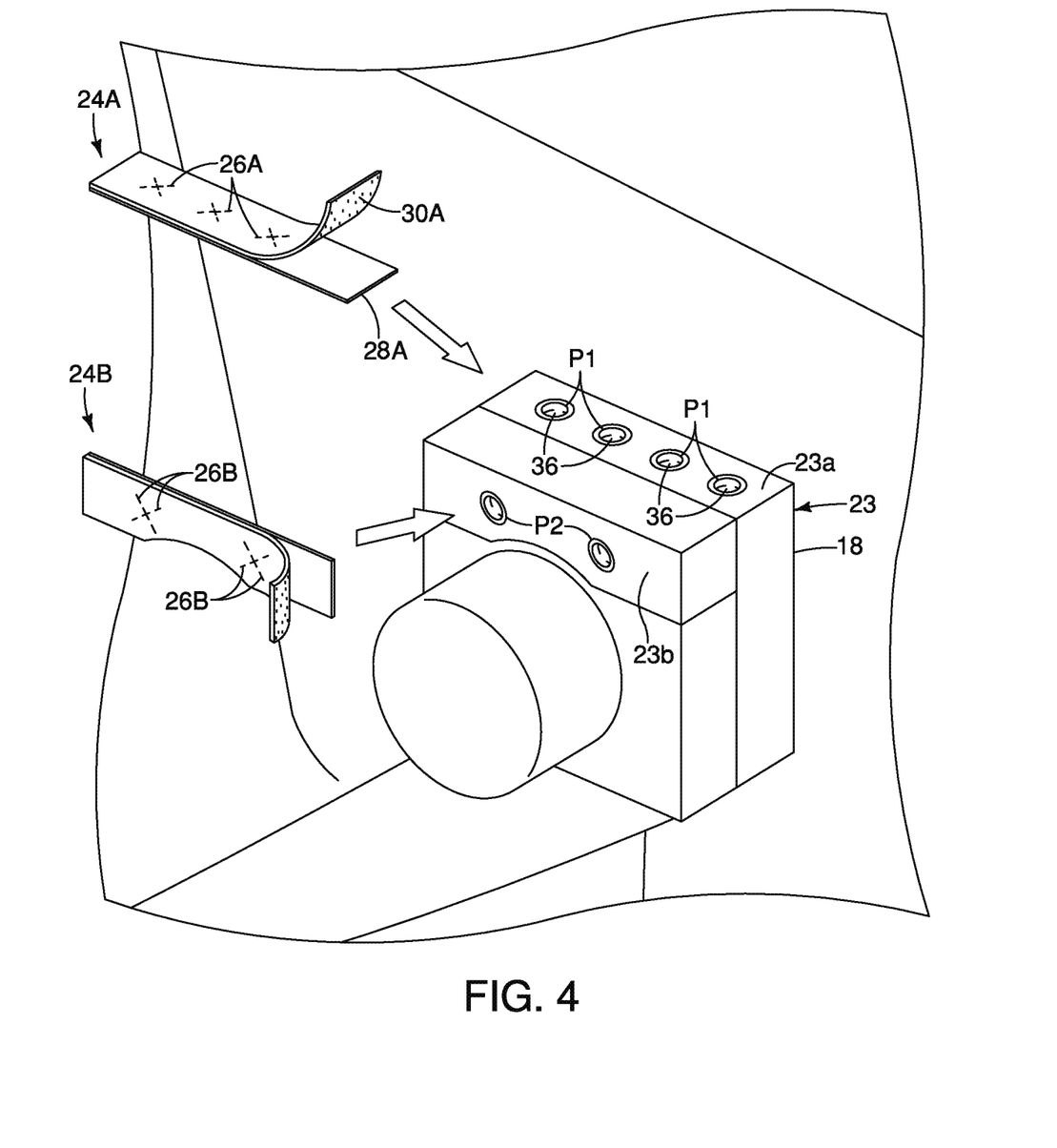
FIG. 4 is a partially exploded perspective view of the hydraulic fluid actuator of FIGS. 2 and 3 prior to attachment of the seal members and prior to connecting the hydraulic hoses to the hydraulic ports of the hydraulic fluid actuator.

As seen in FIG. 4, the actuator 18 has a housing 23 and a first seal member 24A. In the illustrated embodiment, the actuator 18 further includes a second seal member 24B having an adhesive layer 30B and a base layer 32B. The first seal member 24A is applied to the housing 23 at a surface 18a of the actuator 18 prior to attachment of the hydraulic hose assembly 20 to the actuator 18 to prevent contaminates from entering into the housing 23. In particular, the housing 23 has a plurality of first hydraulic hose ports P1 that are each configured to receive one of the first hydraulic hoses L1. The housing 23 further has a plurality of second hydraulic hose ports P2 that are each configured to receive one of the second hydraulic hoses L2.

The master cylinder 16 is mechanically connected to a brake pedal (not shown). When a driver pushes on the brake pedal, the master cylinder 16 is operated to increase hydraulic pressure within the second hydraulic hoses L2 to transmit hydraulic pressure from the master cylinder 16 to the actuator 18 which then transmits hydraulic pressure to the first hydraulic hoses L1 to fluidly operate the calipers 22. The actuator 18 is an example of a hydraulic modulator that includes solenoid-operated valves (not shown) controlled by an ABS computer (not shown). When power is applied to the solenoid valves, magnetic force opens and closes the solenoid valves in the actuator 18 which controls the flow of brake fluid through the first hydraulic hoses L1 to operate the calipers 22.

Figure 5:
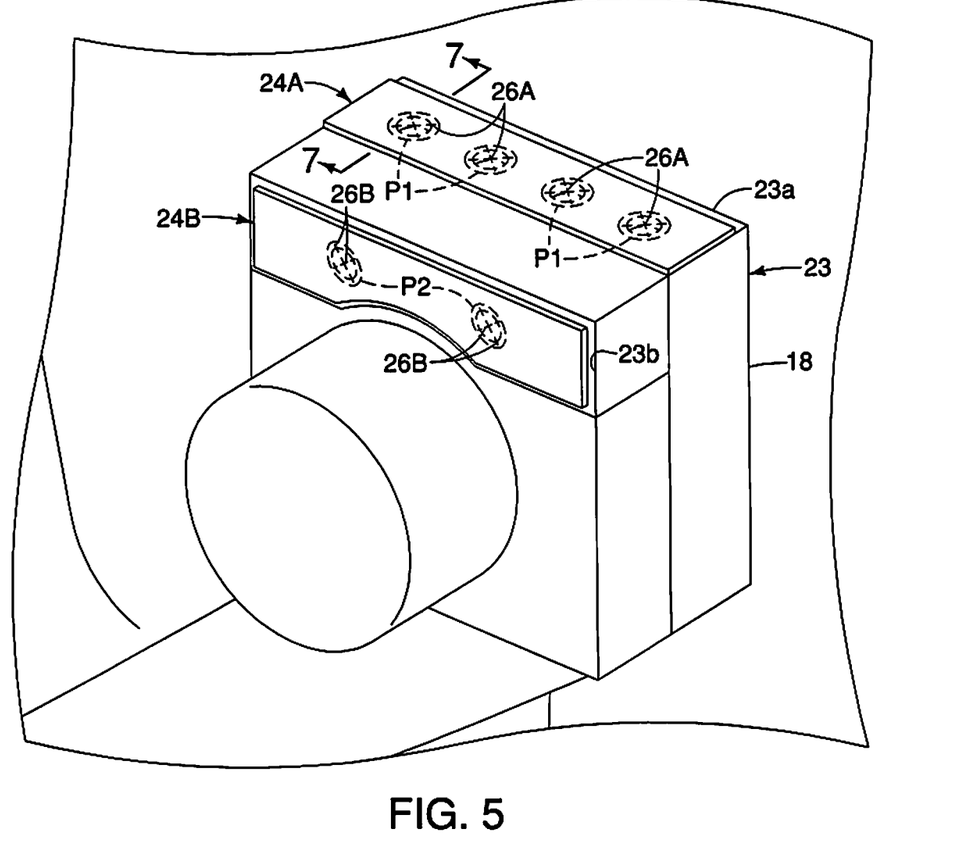
FIG. 5 is a perspective view of the hydraulic fluid actuator of FIGS. 2 to 4 with the seal members overlying the hydraulic ports prior to connecting the hydraulic hoses to the hydraulic ports of the hydraulic fluid actuator.
Figure 6:
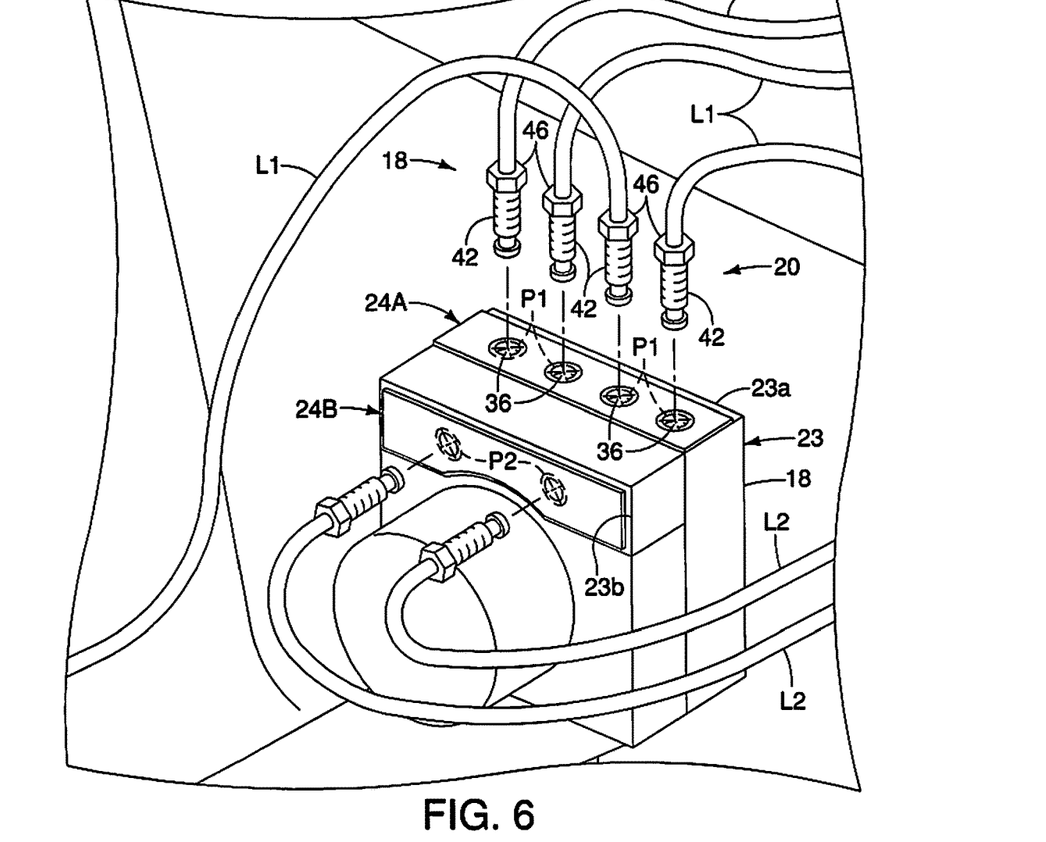
FIG. 6 is a partially exploded perspective view of the hydraulic fluid actuator of FIGS. 2 to 5 and portions of the hydraulic hose assembly prior to connecting the hydraulic hoses to the hydraulic ports of the hydraulic fluid actuator.

Typically, prior to delivery of the actuator 18 to the manufacturing facility, the first hydraulic hose ports P1 are covered with the first seal member 24A in order to prevent dirt, water, grease or other contaminants from entering the first hydraulic hose ports P1, as shown in FIGS. 4 to 6. Likewise, prior to delivery of the actuator 18 to the manufacturing facility, the second hydraulic hose ports P2 are covered with the second seal member 24B in order to prevent dirt, water, grease or other contaminants from entering the second hydraulic hose ports P2, as shown in FIGS. 4 to 6. Alternatively, the first seal member 24A can be split into four individual seal members that are disposed over the first hydraulic hose ports P1, and/or the second seal member 24B can be split into two individual seal members that are disposed over the second hydraulic hose ports P2. In this alternative configuration, the individual seal members are individually attached to the housing 23 of the actuator 18 prior to attachment of the first and second hydraulic hoses L1 and L2 of the hydraulic hose assembly 20. During assembly of the vehicle 10, the actuator 18 is delivered to the vehicle manufacturing facility to be attached to the hydraulic hose assembly 20 and various other components of the vehicle 10. At this stage, each of the first hydraulic hoses L1 of the hydraulic hose assembly 20 is inserted through the first seal member 24A into a corresponding one of the first hydraulic hose ports P1 of the actuator 18. Likewise, each of the second hydraulic hoses L2 of the hydraulic hose assembly 20 is inserted through the second seal member 24B into a corresponding one of the second hydraulic hose ports P2 of the actuator 18.

In the illustrated embodiment, the first seal member 24A is provided that is sized and dimensioned to be disposed on a first surface 23a of the housing 23 of the actuator 18 that has the first hydraulic hose ports P1. The second seal member 24A is provided that is sized and dimensioned to be disposed on a second surface 23b of the housing 23 of the actuator 18 that has the second hydraulic hose ports P2. The first and second seal members 24A and 24B are identical except in terms of size and shape.

The first seal member 24A includes a plurality of frangible sections 26A. One of the frangible sections 26A is disposed in front of one of the first hydraulic hose ports P1 of the actuator 18 after the first seal member 24A is fixed to the first surface 23a of the housing 23. The frangible sections 26A are configured to rupture upon attachment of the first hydraulic hoses L1 into the first hydraulic hose ports P1 with the first seal member 24A remaining between the first hydraulic hoses L1 and the first hydraulic hose ports P1. Thus, there is no need for removal of the first seal member 24A from the actuator 18 during the assembly of the first hydraulic hoses L1 to the first hydraulic hose ports P1. Similarly, the second seal member 24B includes a plurality of frangible sections 26B that align with a corresponding one of the second hydraulic hose ports P2 after the second seal member 24B is fixed to the second surface 23b of the housing 23.

As will be further discussed below, the first and second seal members 24A and 24B can be constructed of various materials depending on the configuration of the first and second hydraulic hose ports P1 and P2 and the first and second hydraulic hoses L1 and L2. For example, the first and second seal members 24A and 24B can be constructed of an oil soluble material that can dissolve in brake fluid if the first and second seal members 24A and 24B extend beyond the connection of the first and second hydraulic hoses L1 and L2 and into the brake fluid inside of the housing 23 of the actuator 18. Alternatively, for example, the first and second seal members 24A and 24B can be constructed of a lubricating material that can act as a lubricant between the first and second hydraulic hose ports P1 and P2 and the first and second hydraulic hoses L1 and L2 so that secure connection can be obtained. In this disclosure, as the structures of each of the first hydraulic hose ports P1 are identical, the structure of one of the first hydraulic hose ports P1 will be discussed and illustrated in detail herein for the sake of brevity. Similarly, as the structures of each of the first hydraulic hoses L1 are identical, the structure of one of the first hydraulic hoses L1 will only be discussed and illustrated in detail herein for the sake of brevity. Also since the first and second seal members 24A and 24B are identical except in terms of size and shape, only the first seal member 24A will be discussed and illustrated in detail herein for the sake of brevity.

Referring now to FIG. 4, the first seal member 24A comprises a base layer 28 and an adhesive layer 30A. Prior to attaching the first seal member 24A to the housing 23, the first seal member 24A can further comprise a release layer 32 that is disposed over the adhesive layer 30. The base layer 28A of the first seal member 24A includes the frangible sections 26A. Thus, the frangible sections 26A are configured to rupture upon attachment of the first hydraulic hoses L1 into the first hydraulic hose ports P1. To adhere the first seal member 24A to the actuator 18, a user removes the release layer 32 to adhesively attach the first seal member 24A onto the actuator 18 by the adhesive layer 30. As seen in FIG. 5, the first seal member 24A is disposed on the surface 23a of the actuator 18 such that each of the frangible sections 26A aligns with a corresponding one of the first hydraulic hose ports P1.

In the illustrated embodiment, the base layer 28A is a one-piece member, sized and dimensioned to be disposed in front of all of the hydraulic hose ports P1. While the actuator 18 of the illustrated embodiment includes four of the hydraulic hose ports P1 that are all covered by the first seal member 24A, it will be apparent to one skilled in the art that the first seal member 24A can be configured to be disposed to cover only one of the hydraulic hose ports P1. Moreover, the first seal member 24A can be configured to cover more than four hydraulic hose ports if used with an actuator having more than four hydraulic hose ports. For example, the first seal member 24A can be disposed in front of just one of the plurality of hydraulic hose ports P1 to seal the one of the first hydraulic hose ports P1. In other words, while the first seal member 24A of the illustrated embodiment is sized and dimensioned to seal each of the first hydraulic hose ports P1, the first seal member 24A can be sized and dimensioned to seal a various number of the first hydraulic hose ports P1.

In the illustrated embodiment, the first seal member 24A is fixedly secured to the actuator 18 by the adhesive layer 30. In the illustrated embodiment, the adhesive layer 30A is pre-applied to the base layer 28A prior to disposing the first seal member 24A onto the hydraulic fluid actuator 18. Thus, the first seal member 24A includes an adhesive surface. Also, as shown in FIG. 4, the adhesive layer 30A is pre-applied to the base layer 28A except at the frangible sections 26A. The adhesive layer 30A is illustrated as dotted portions of the base layer 28A. However, it will be apparent to those skilled in the art from this disclosure that the adhesive layer 30A can be pre-applied to the entirety of the base layer 28A including the frangible sections 26A if the adhesive layer 30A is composed of a material that does not contaminate the brake fluid which is delivered from the first hydraulic hose L1 to the first hydraulic hose ports P1 and vice versa. Alternatively, the first surface 23a of the housing 23 of the actuator 18 can be applied with an adhesive to secure the base layer 28A thereon.

Figure 8:
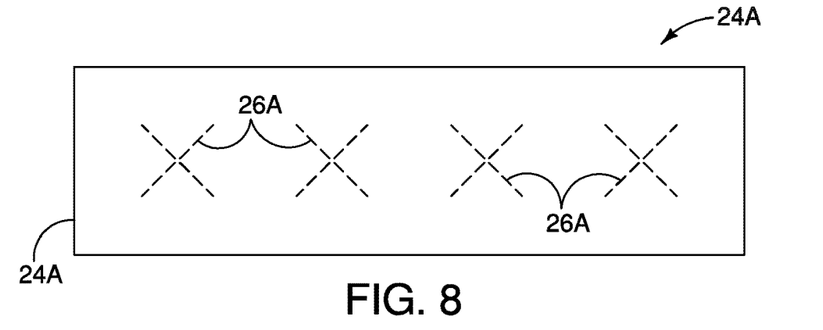
FIG. 8 is a plan view of a seal member having a plurality of frangible sections having a first size and arranged in a first patterned arrangement.
Figure 9:
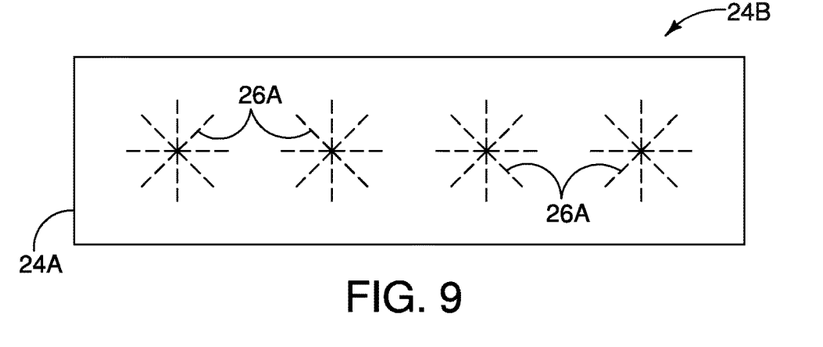
FIG. 9 is a plan view of a seal member having a plurality of frangible sections having the first size and arranged in a second patterned arrangement.
Figure 11:
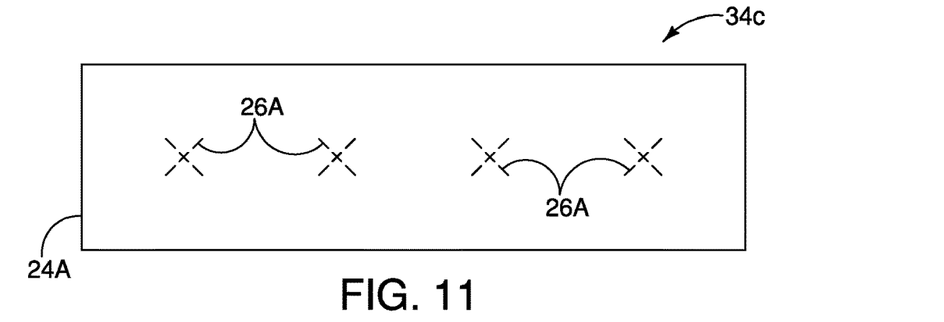
FIG. 11 is a plan view of a seal member having a plurality of frangible sections having a second size and arranged in the first patterned arrangement.
Figure 12:
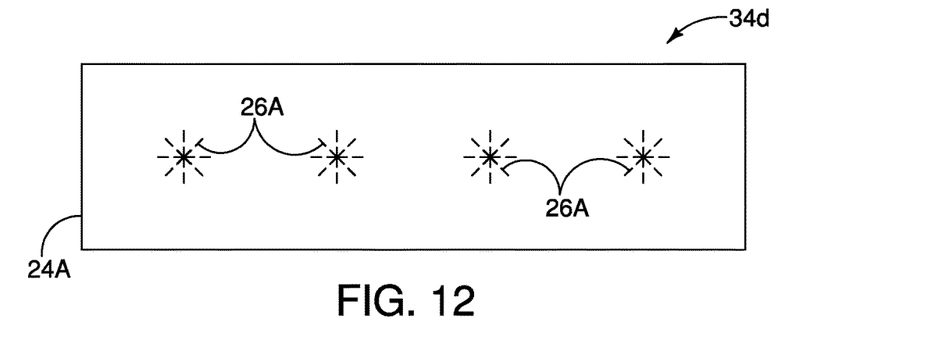
FIG. 12 is a plan view of a seal member having a plurality of frangible sections having a second size and arranged in the second patterned arrangement.

As stated previously, the base layer 28A includes the frangible sections 26A. The term "frangible section" as used herein refers to a section that is easily broken as compared to the surround sections. As shown, the frangible section 26A includes perforations. Preferably, the perforations have a patterned arrangement. As shown in FIGS. 8 and 11, the patterned arrangement can be x-shaped perforations 34a. Alternatively, as shown in FIGS. 9 and 12, the patterned arrangement can be asterisk-shaped perforations 34b. It will be apparent to one skilled in the art that the frangible sections 26A can have a variety of patterned arrangements as needed and/or desired. Furthermore, although not shown, it will be apparent to one skilled in the art from this disclosure that the frangible sections 26A can include weakened areas, such as score lines, instead of, or in addition to, perforations. For example, the frangible sections 26A can include areas of the base layer 30A that is thinner and more easily ruptured by the insertion of the first hydraulic hose port P1.

Figure 13:
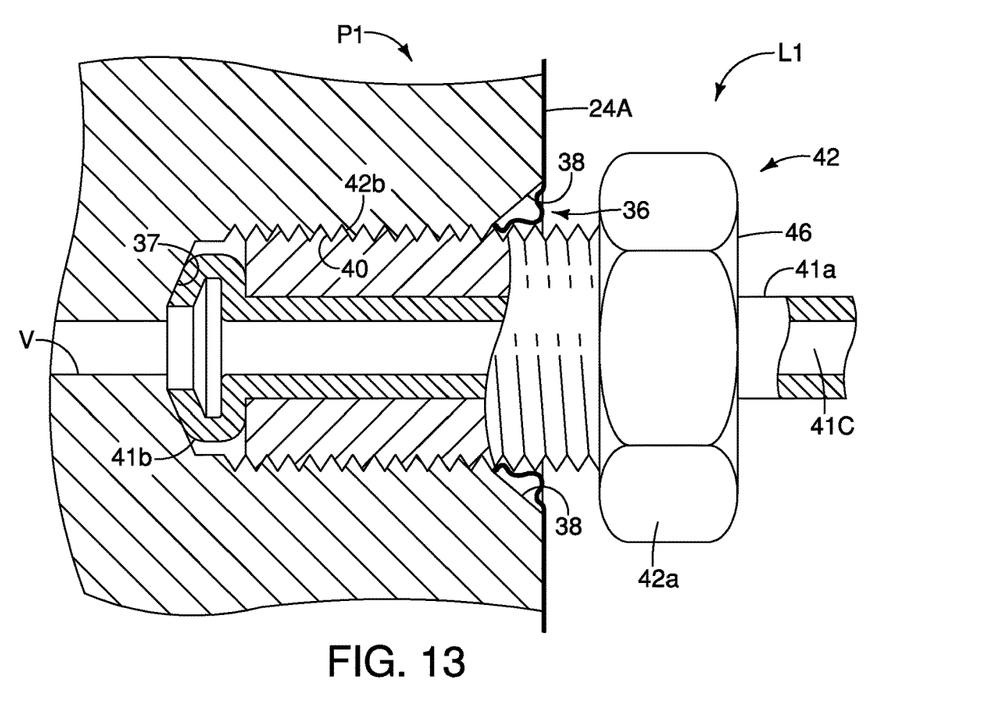
FIG. 13 is a cross-sectional view, similar to FIG. 10, of the hydraulic hose port of the hydraulic fluid actuator of FIGS. 2 to 6, but with the hydraulic hose inserted into the port and the frangible section of the seal member having the second size pierced.

The frangible sections 26A can be of different sizes. For example, as seen in FIGS. 8 and 9, the frangible sections 26A are sized to substantially correspond to the size of the first hydraulic hose ports P1. Alternatively, the frangible sections 26A can be sized to be smaller than the size of the hydraulic ports P1, as seen in FIGS. 11 and 12. Also, each first seal member 24A can have frangible sections 26A of varying sizes. As stated previously, for each frangible section 26, the first seal member 24A is configured to remain between the first hydraulic hose L1 and one of the first hydraulic hose ports P1 after attachment. As further explained below, depending on the size of the frangible section 26A, the first seal member 24A can remain between threaded areas of the first hydraulic hose L1 and the first hydraulic hose port P1 (FIG. 10), or the first seal member 24A can be bunched in chamfered portions 38 of the first hydraulic hose port P1 (FIG. 13).

Figure 7:
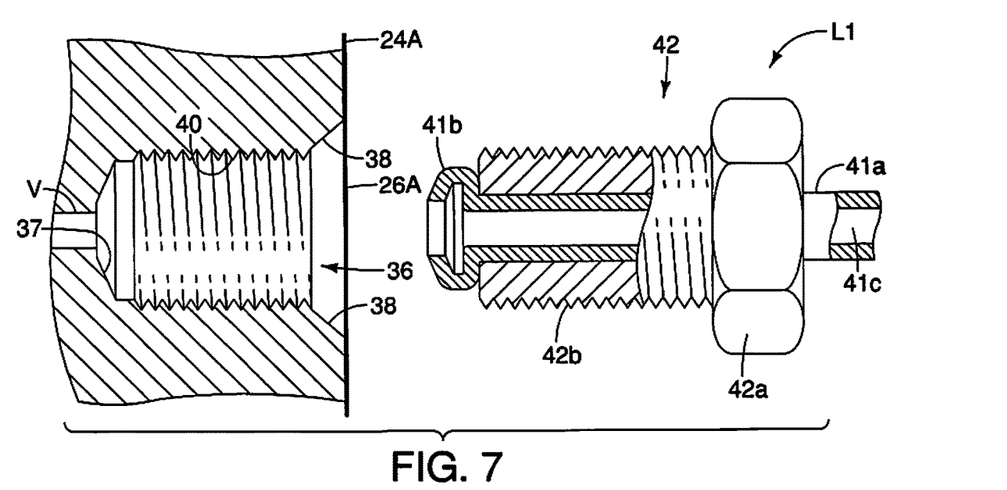
FIG. 7 is a partial cross-sectional view of one of the hydraulic hose ports of the hydraulic fluid actuator of FIGS. 2 to 6 with the seal member disposed thereon as seen along section line 7-7, and one of the hydraulic hoses in position to be inserted into the hydraulic port.
Figure 10:
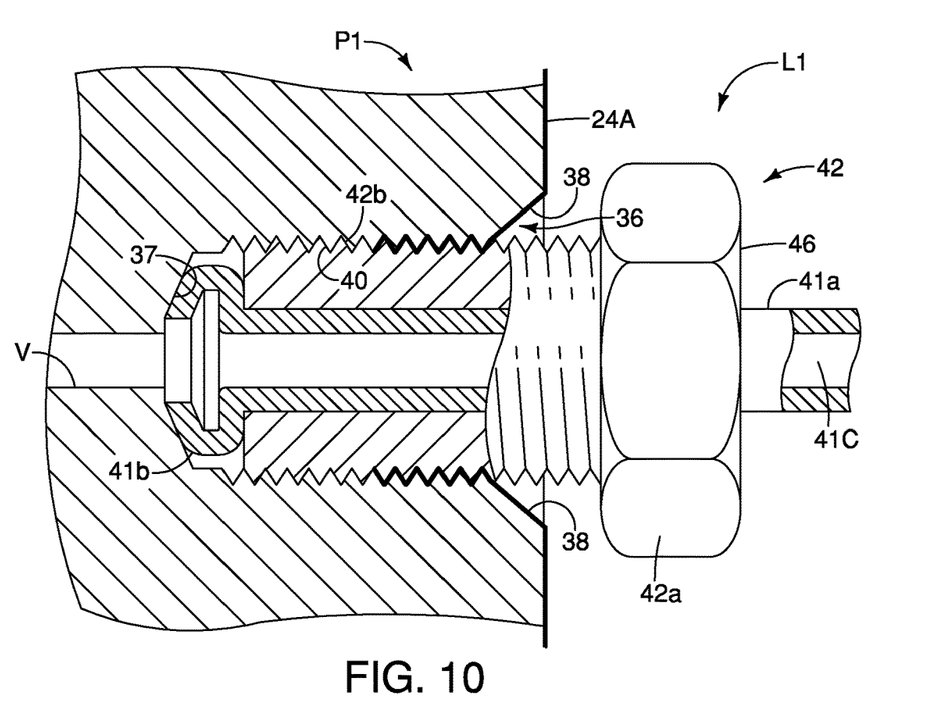
FIG. 10 is a cross-sectional view, similar to FIG. 7, of the hydraulic hose port of the hydraulic fluid actuator of the hydraulic fluid actuator of FIGS. 2 to 6 but with the hydraulic hose inserted into the port and the frangible section of the seal member having the first size pierced.

The rupture of the first seal member 24A during the attachment of the hydraulic hose to the first hydraulic hose port P1 will now be discussed. Referring to FIGS. 7, 10 and 13, the first hydraulic hose port P1 includes an opening 36, a chamfered portion 38 and an internal thread 40. The opening 36 leads to the chamfered portion 38. The internal thread 40 is located adjacent the chamfered portion 38. Thus, each of the first hydraulic hose ports P1 includes an internal thread 40. The internal thread 40 is a threaded bore (i.e., female fitting) that is configured to threadedly receive the first hydraulic hose L1. The hydraulic port P1 includes an end wall 37 that is disposed adjacent to a fluid passageway V of housing 23 of the actuator 18. The fluid passageway V is configured to be in fluid communication with the first hydraulic hose L1 once the first hydraulic hose L1 is secured to the first hydraulic hose port P1.

The first hydraulic hose L1 includes a tubular wall portion 41a and an end portion 41b. An internal passageway 41c extends through the tubular wall portion 41a and the end portion 41b. The first hydraulic hose L1 is provided with a threaded fitting 42 to attach the first hydraulic hose L1 to the housing 23. The threaded fitting 42 is slidably retained on the tubular portion 41a by the end portion 41b. The threaded fitting 42 includes a tool engagement portion 42a and an external thread 42b. The external thread 42b is configured to threadedly engage the internal thread 40 of the first hydraulic hose port P1. During installation of the first hydraulic hose L1, the head portion 41 pierces the first seal member 24A at the frangible section 26A to enter the opening 36 of the first hydraulic hose port P1. The end portion 41b is an annular flange that is configured to contact the end wall 37 of the first hydraulic hose port P1 to create a seal between the first hydraulic hose L1 and the first hydraulic hose port P1. By rotating the threaded fitting 42, the hydraulic hose is adjustably secured into the first hydraulic hose port P1. The first hydraulic hose L1 is made of a suitable material that delivers brake fluid from the actuator 18 to one of the calipers 22.

As stated above, that the first seal member 24A can extend into the first hydraulic hose port P1 at different lengths depending on the size of the frangible sections 26. For example, referring to FIGS. 8 to 10, the frangible sections 26A of the first hydraulic hose port P1 can be substantially the same size as the opening 36 of the first hydraulic hose port P1. Upon rupture of the first seal member 24A due to the attachment of the first hydraulic hose L1 to the first hydraulic hose port P1, the first seal member 24A remains between the internal thread 40 of the first hydraulic hose port P1 and the external threads 42b of the first hydraulic hose L1 (FIG. 10). In this instance, it is preferable that the first seal member 24A is constructed of a lubricating material that is disposed between the external thread 42b of the first hydraulic hose L1 and the internal thread 40 of the first hydraulic hose port P1 when the first hydraulic hose L1 is attached to the first hydraulic hose port P1. By acting as a lubricant, the first seal member 24A can facilitate a tighter seal between the internal thread 40 of the first hydraulic hose port P1 and the external thread 42b of the threaded fitting 42. For example, the first seal member 24A can include polytetrafluoroethylene, similar to thread seal tape, to facilitate a tighter seal between the internal thread 40 of the first hydraulic hose port P1 and the external thread 42b of the threaded fitting 42. Alternatively, the first seal member 24A is constructed of an oil soluble material so that the first seal member 24A can dissolve in the brake fluid.

Figure 14:
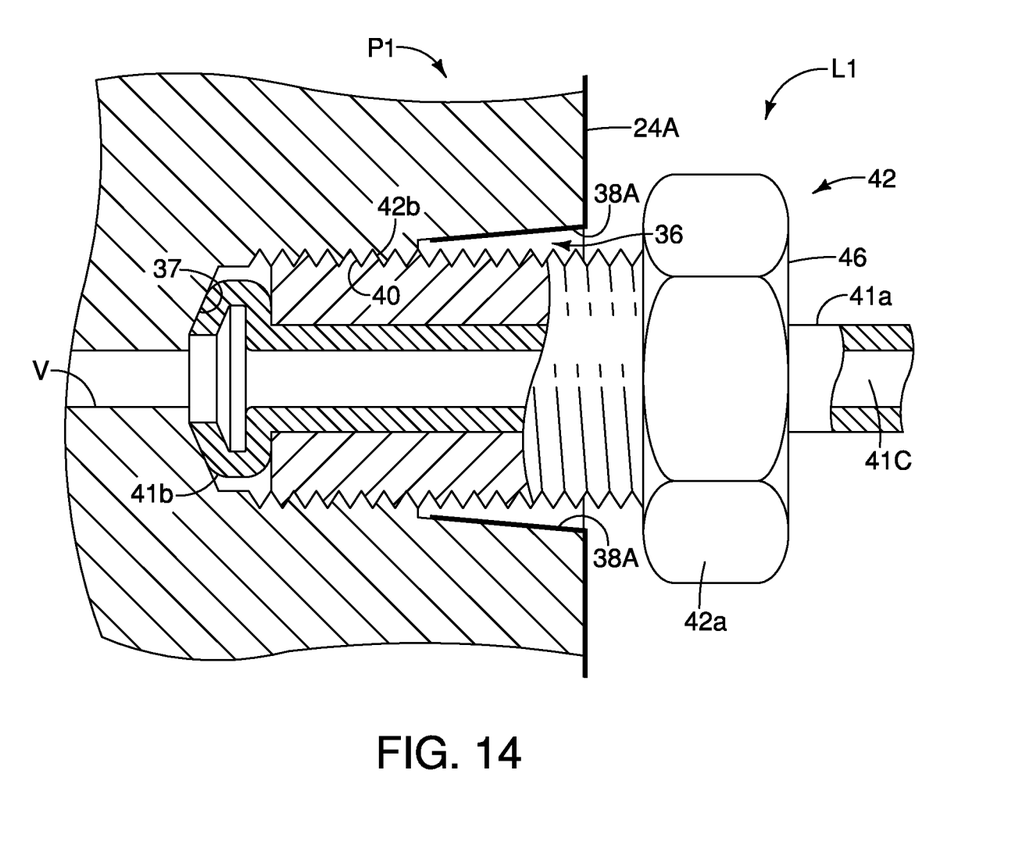
FIG. 14 is a cross-sectional view, similar to FIG. 13, of the hydraulic hose of the hydraulic fluid actuator of FIGS. 2 to 6, with the hydraulic hose inserted into a port having an elongated chamfered section and the frangible section of the seal member having the second size pierced.

Alternatively, the frangible sections 26A can be smaller than the opening 36 of the first hydraulic hose port P1 as seen in FIGS. 11, 13 and 14. Upon rupture of the first seal member 24A due to attachment of the first hydraulic hose L1 to the first hydraulic hose port P1, the first seal member 24A is bunched at the chamfered portions 38 of the first hydraulic hose port P1 (FIG. 13). In other words, the first seal member 24A does not extend into the engagement between the internal thread 40 and the external thread 42b when the frangible section 26A has a sufficiently small size. Alternatively, the first hydraulic hose port P1 can have elongated chamfered portions 38A such that the first seal member 24A extends into the elongated chamfered portions 38A but is not bunched (FIG. 14). Preferably, the first seal member 24A extends into the elongated chamfered portions 38A and does not extend into the engagement between the internal thread 40 and the external thread 42b regardless of the size of the frangible section 26A.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic fluid actuator comprising:
    a housing having at least one hydraulic hose port that is configured to receive a hydraulic hose, the at least one hydraulic hose port including an internal thread; and
    a seal member sealing the at least one hydraulic hose port, the seal member including a frangible section having perforations configured to rupture upon attachment of the hydraulic hose into a respective one of the hydraulic hose ports with the seal member remaining between the hydraulic hose and the respective one of the hydraulic hose ports after attachment, the seal member being disposed over and aligned with an outermost surface of the housing such that the seal member seals an exterior of the hydraulic hose port so that the hydraulic hose ruptures the seal member upon entering the exterior of the housing and the hydraulic hose contacts the perforations prior to contacting the internal thread of the hydraulic hose port, the at least one hydraulic hose port further including a tapering surface that defines a chamfered portion of the at least one hydraulic hose port that connects and contacts the outermost surface of the housing and the internal thread of the at least one hose port.

2. The hydraulic fluid actuator according to claim 1, wherein the seal member includes a plurality of frangible sections.

3. The hydraulic fluid actuator of claim 2, wherein the seal member further comprises a base layer having the plurality of frangible sections.

4. The hydraulic fluid actuator according to claim 3, wherein
    the at least one hydraulic port includes a plurality of hydraulic ports, the base layer being a one-piece member that is sized and dimensioned to be disposed in over at least two of the plurality of hydraulic hose ports.

5. The hydraulic fluid actuator of claim 1, wherein the seal member is adhesively attached to the housing.

6. The hydraulic fluid actuator according to claim 1, wherein
    the seal member is constructed of a lubricating material that is disposed between an external thread of the hydraulic hose and the internal thread of the at least one hydraulic hose port when the hydraulic hose is attached to the at least one hydraulic hose port.

7. The hydraulic fluid actuator according to claim 1, wherein
    the perforations are arranged in an x-shaped pattern.

8. The hydraulic fluid actuator according to claim 1, where
    the perforations are arranged in an asterisk-shaped pattern.

9. The hydraulic fluid actuator of claim 1, wherein the seal member is constructed of an oil soluble material.

10. The hydraulic fluid actuator of claim 1, wherein the seal member includes polytetrafluoroethylene.

11. A hydraulic fluid actuator comprising:
    a housing having at least one hydraulic hose port that is configured to receive a hydraulic hose; and
    a seal member sealing the at least one hydraulic hose port, the seal member including a frangible section configured to rupture upon attachment of the hydraulic hose into the at least one hydraulic hose port with the seal member remaining between the hydraulic hose and the at least one hydraulic hose port after attachment, wherein the seal member further comprises an adhesive layer overlying one side of a base layer of the seal member and adhering the base layer to the housing, the adhesive layer defining part of the frangible section.

12. A hydraulic fluid actuator comprising:
a housing having a plurality of hydraulic hose ports that are each configured to receive a hydraulic hose; and
a tape having an adhesive layer sealing the plurality of hydraulic hose ports, the tape including a plurality of frangible sections each being disposed over one of the plurality of hydraulic hose ports, the plurality of frangible sections being defined by perforations disposed on the adhesive layer that are configured to rupture upon attachment of the hydraulic hose into a respective one of the plurality of hydraulic hose ports.

* * * * *